(12) United States Patent
Kelk et al.

(10) Patent No.: US 11,318,993 B1
(45) Date of Patent: May 3, 2022

(54) MODULAR CROSS CAR BEAM ASSEMBLY

(71) Applicant: POLESTAR PERFORMANCE AB, Gothenburg (SE)

(72) Inventors: Ross Kelk, Warwickshire (GB); Lee Cashman, Warwickshire (GB); David Palmer, Leicester (GB)

(73) Assignee: POLESTAR PERFORMANCE AB, Gothenburg (SE)

( * ) Notice: Subject to any disclaimer, the term of this patent is extended or adjusted under 35 U.S.C. 154(b) by 16 days.

(21) Appl. No.: 17/069,126

(22) Filed: Oct. 13, 2020

(51) Int. Cl.
  *B62D 21/03* (2006.01)
  *B62D 27/02* (2006.01)
  *B60R 21/36* (2011.01)
  *B62D 29/04* (2006.01)
  *B62D 27/06* (2006.01)

(52) U.S. Cl.
  CPC ............. *B62D 21/03* (2013.01); *B60R 21/36* (2013.01); *B62D 27/02* (2013.01); *B62D 27/06* (2013.01); *B62D 29/041* (2013.01)

(58) Field of Classification Search
  CPC ........ B62D 21/03; B62D 27/02; B62D 27/06; B62D 29/041; B60R 21/36
  USPC ....................................................... 296/204
  See application file for complete search history.

(56) References Cited

U.S. PATENT DOCUMENTS

| | | | |
|---|---|---|---|
| 4,709,943 A | 12/1987 | Yoshimura et al. | |
| 5,311,960 A | 5/1994 | Kukainis et al. | |
| 5,931,520 A * | 8/1999 | Seksaria | B60R 21/045 296/70 |
| 6,039,380 A | 3/2000 | Heilig et al. | |
| 6,073,987 A * | 6/2000 | Lindberg | B62D 25/142 180/90 |
| 6,176,544 B1 | 1/2001 | Seksaria et al. | |
| 6,560,872 B2 | 5/2003 | Morrison et al. | |
| 6,761,395 B2 | 7/2004 | Charbonnel | |
| 7,284,789 B2 | 10/2007 | Wolf | |
| 7,607,691 B2 * | 10/2009 | Arnold | B29C 33/52 280/751 |
| 7,891,707 B2 | 2/2011 | Kuwano | |
| 8,220,857 B2 * | 7/2012 | Baudart | B62D 25/145 296/72 |
| 8,322,781 B2 * | 12/2012 | Angenheister | B62D 25/145 296/193.02 |

(Continued)

FOREIGN PATENT DOCUMENTS

| CN | 104781060 A | 7/2015 |
|---|---|---|
| CN | 209426867 U | 9/2019 |

(Continued)

OTHER PUBLICATIONS

U.S. Non-Final Rejection dated Nov. 16, 2021, Co-Pending U.S. Appl. No. 17/069,168, 11 Pages.

(Continued)

*Primary Examiner* — Pinel E Romain
(74) *Attorney, Agent, or Firm* — Brooks Kushman P.C.

(57) ABSTRACT

A modular cross car beam assembly for use with a vehicle includes an intermediate beam section, a driver side beam section, and a passenger side beam section. Furthermore, the driver side beam section and the passenger side beam section are attachable on either side of the intermediate beam section depending on whether the vehicle is a left-hand-drive vehicle or a right-hand-drive vehicle.

20 Claims, 8 Drawing Sheets

(56) References Cited

U.S. PATENT DOCUMENTS

| | | | |
|---|---|---|---|
| 8,777,301 B2 * | 7/2014 | Lummitsch | B60K 37/00 |
| | | | 296/208 |
| 10,363,897 B2 | 7/2019 | Citko et al. | |
| 10,457,240 B2 | 10/2019 | Greer, Jr. et al. | |
| 2004/0056463 A1 * | 3/2004 | Marks | B60R 21/045 |
| | | | 280/752 |
| 2008/0048470 A1 | 2/2008 | Vican | |
| 2008/0169660 A1 | 7/2008 | Hedderly | |
| 2008/0169679 A1 | 7/2008 | Hedderly | |
| 2011/0097598 A1 | 4/2011 | McNutt et al. | |
| 2015/0284035 A1 | 10/2015 | Reese | |
| 2018/0086386 A1 | 3/2018 | Pastrick et al. | |
| 2018/0126940 A1 | 5/2018 | Greer, Jr. et al. | |
| 2021/0001924 A1 | 1/2021 | Charbonneau et al. | |
| 2021/0401654 A1 | 12/2021 | Hoel et al. | |

FOREIGN PATENT DOCUMENTS

| | | |
|---|---|---|
| DE | 102 40 395 A1 | 3/2004 |
| DE | 10 2011 051 699 A1 | 1/2013 |
| DE | 102018123831 A1 | 4/2019 |
| EP | 1 609 703 A2 | 12/2005 |
| EP | 3 546 298 A1 | 10/2019 |
| KR | 20140131819 A | 11/2014 |

OTHER PUBLICATIONS

U.S. Notice of Allowance dated Jan. 12, 2022, Co-Pending U.S. Appl. No. 17/069,198, 13 Pages.

PCT International Search Report and Written Opinion of the International Searching Authority, dated Jan. 19, 2022, International Application No. PCT/IB2021/059360, Applicant Polestar Performance AB, 19 Pages.

PCT International Search Report and Written Opinion of the International Searching Authority, dated Jan. 21, 2022, International Application No. PCT/IB2021/059374, Applicant Polestar Performance AB, 21 Pages.

PCT International Search Report and Written Opinion of the International Searching Authority, dated Jan. 20, 2022, International Application No. PCT/IB2021/059415, Applicant Polestar Performance AB, 16 Pages.

U.S. Final Rejection dated Feb. 25, 2022, Co-Pending U.S. Appl. No. 17/069,168, 13 Pages.

* cited by examiner

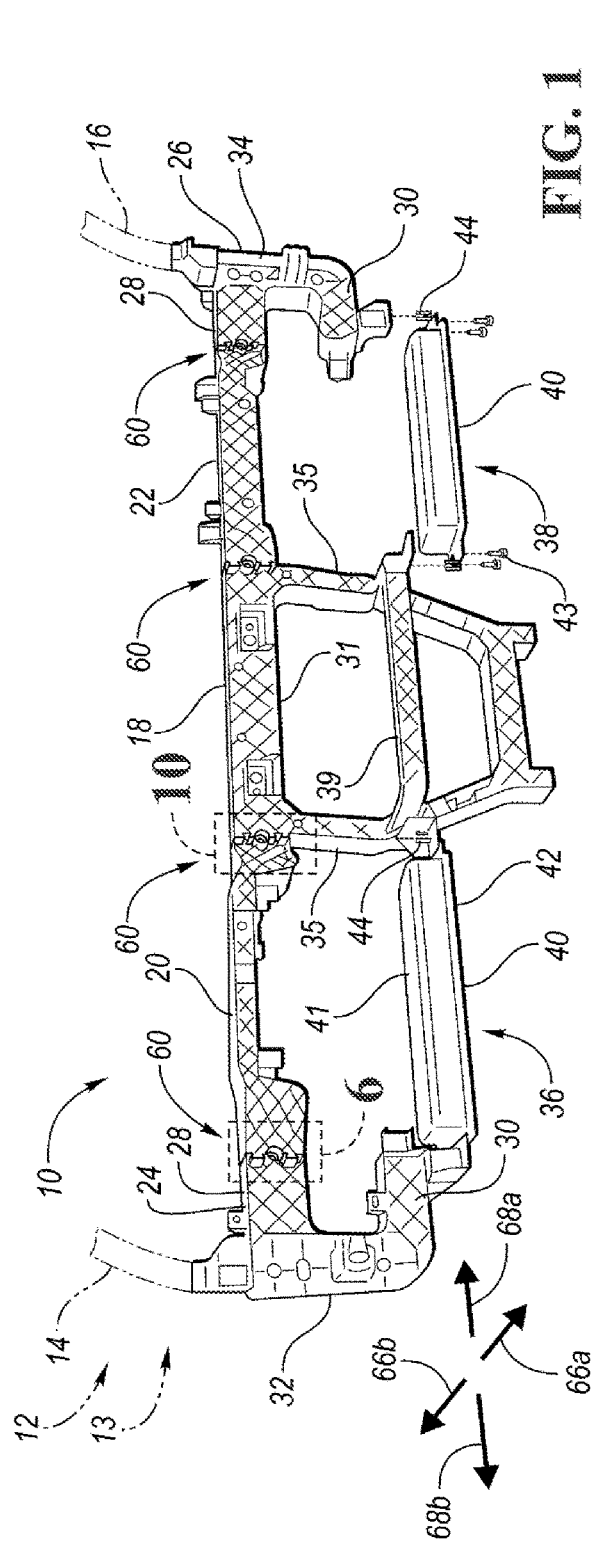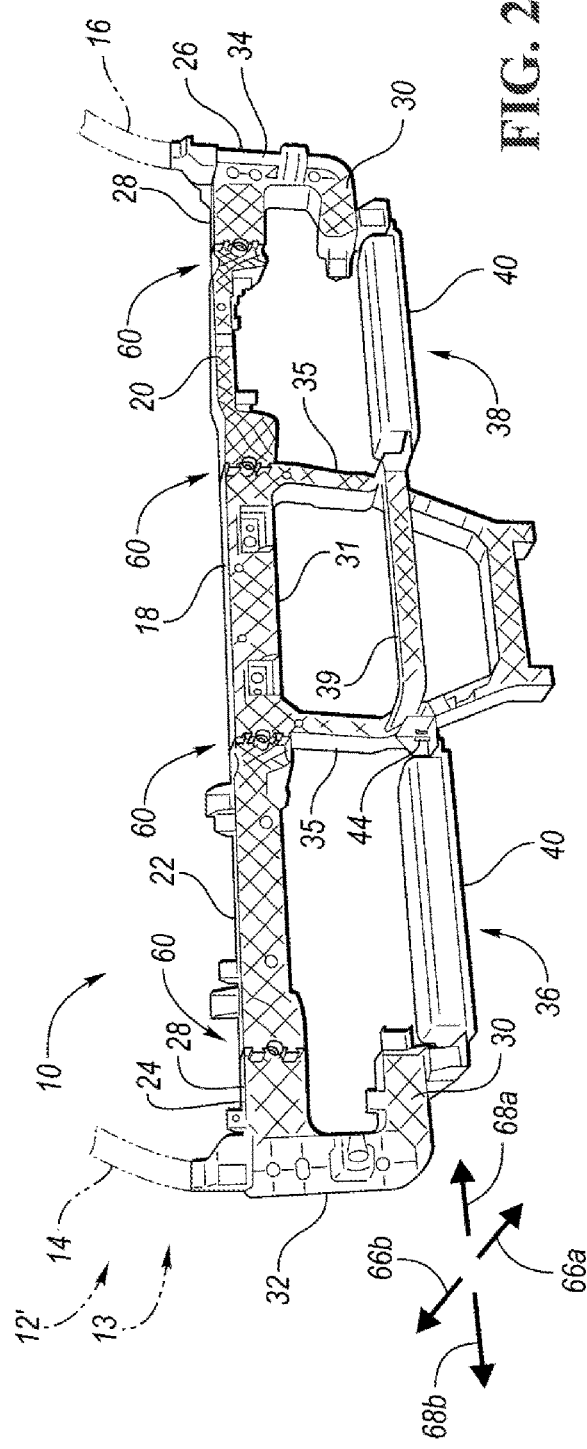

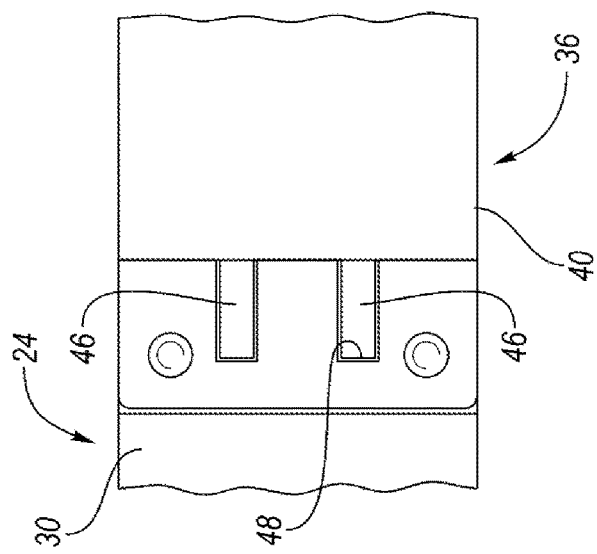
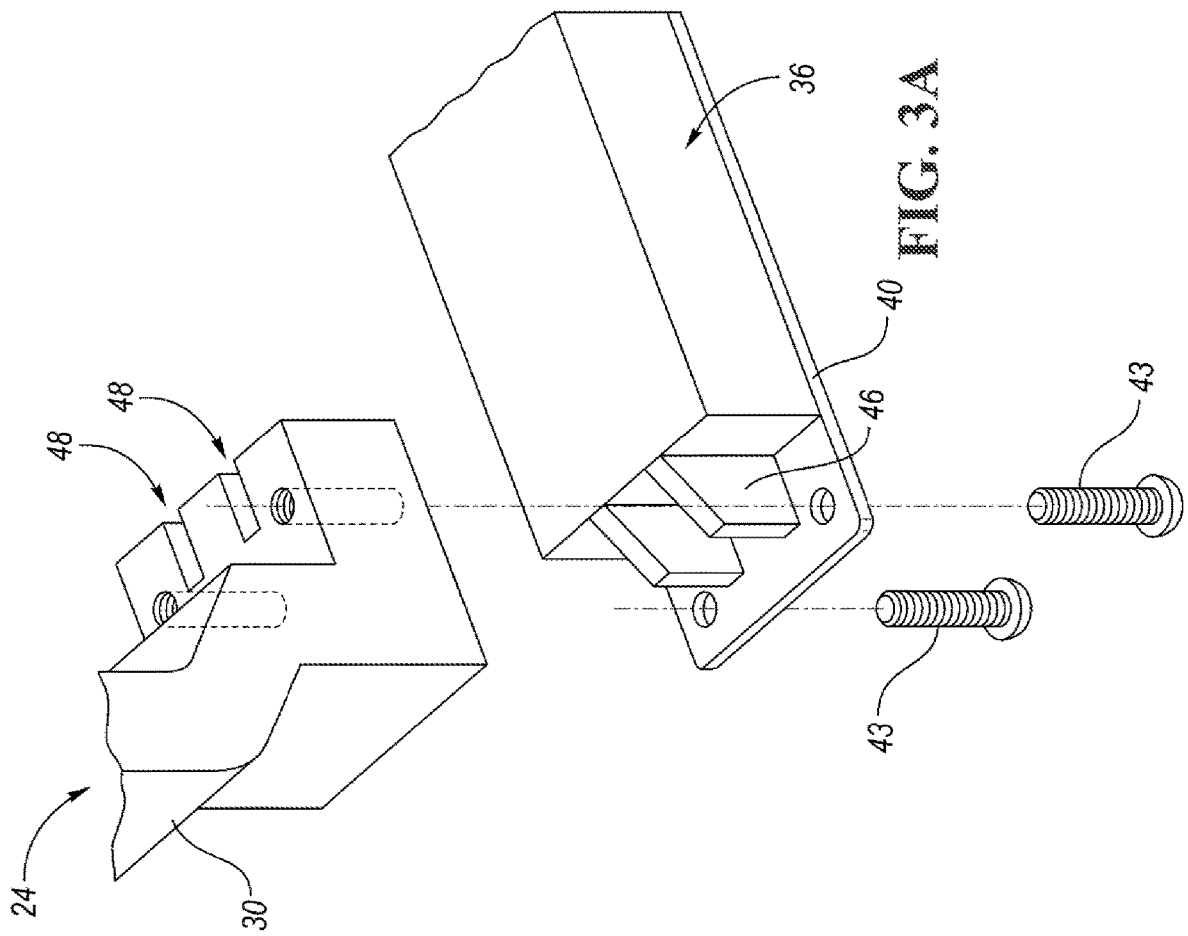

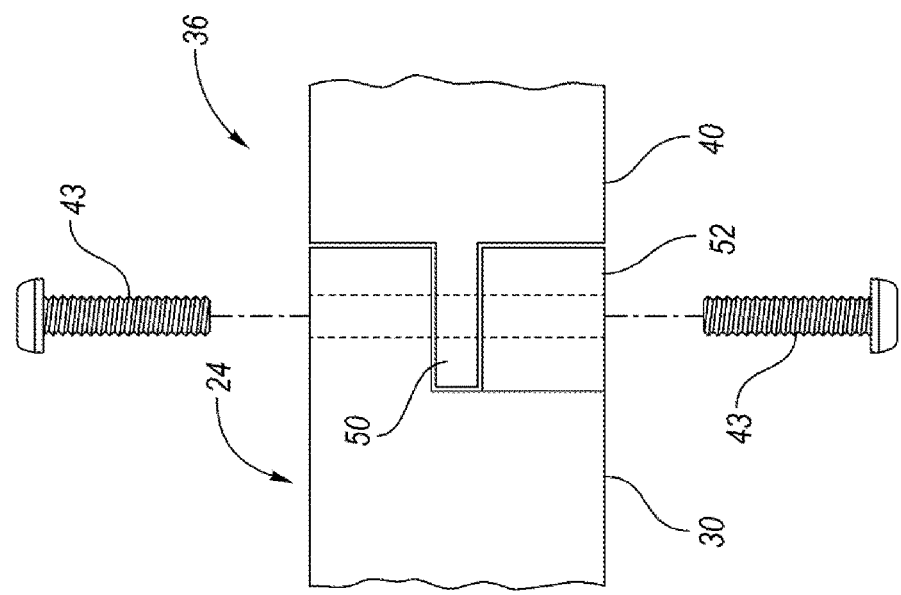
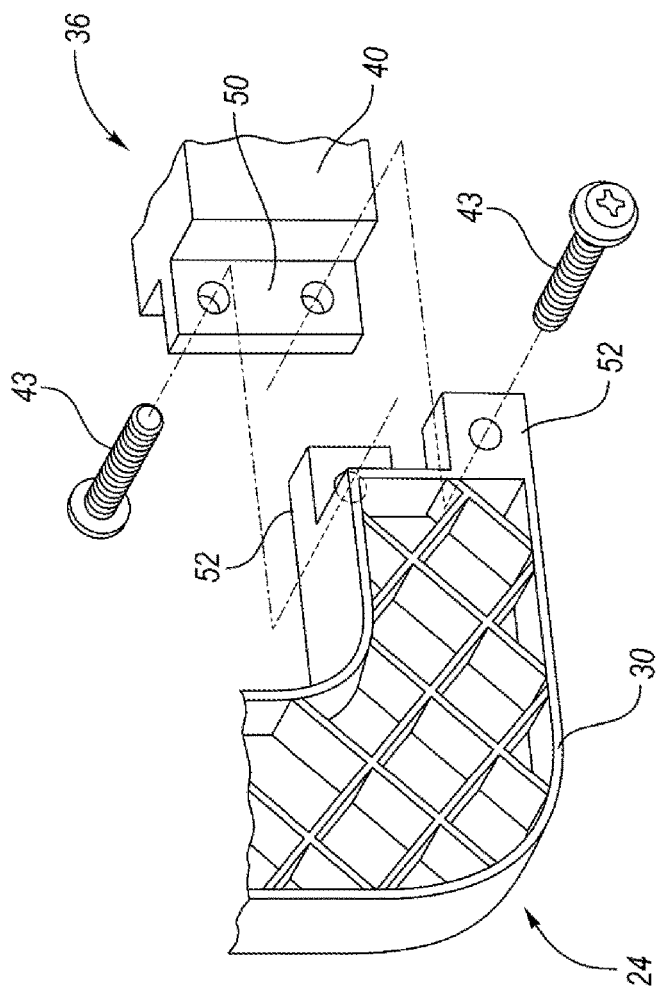
FIG. 4B
FIG. 4A

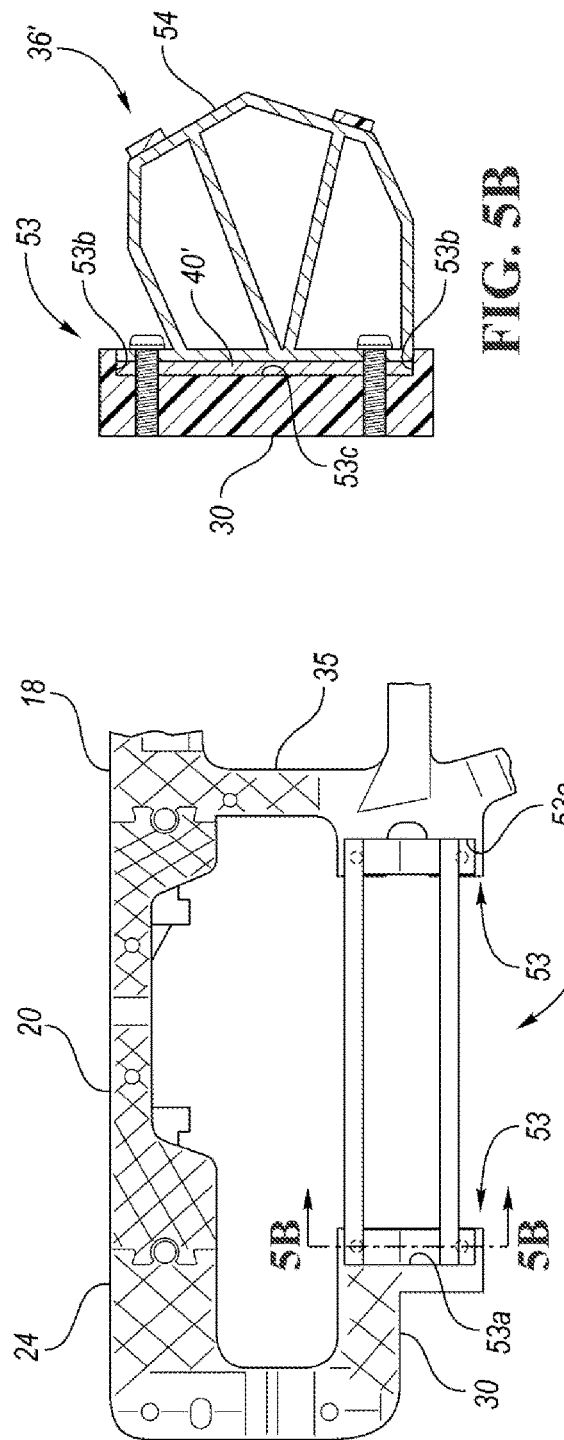
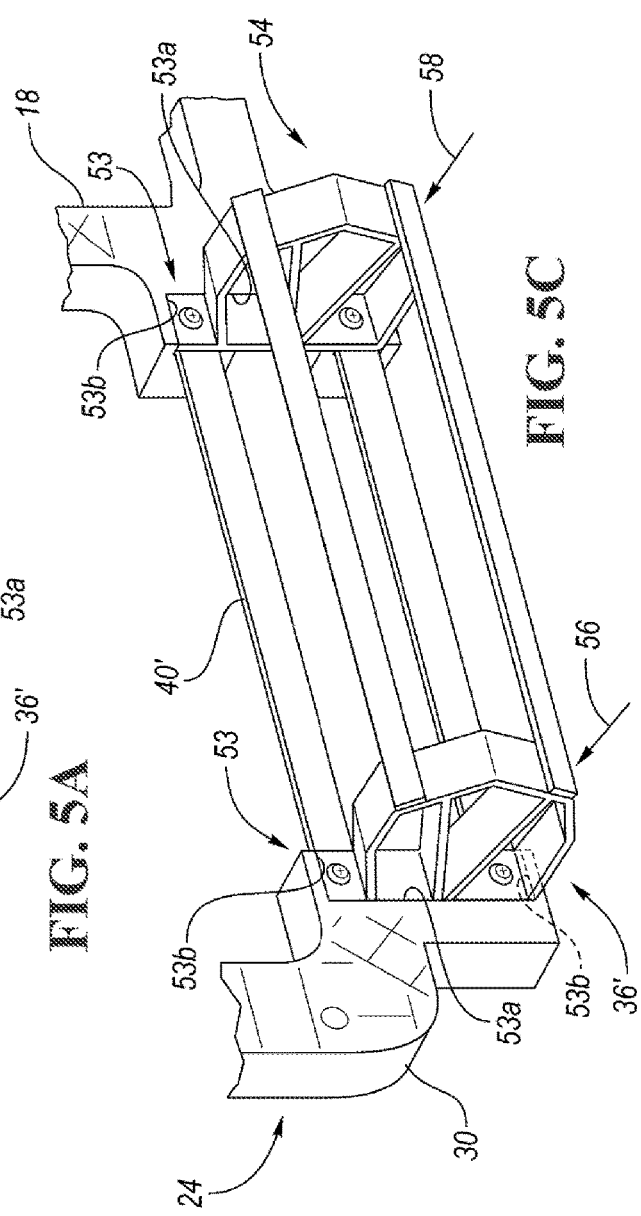

MODULAR CROSS CAR BEAM ASSEMBLY

TECHNICAL FIELD

The disclosure relates to a cross car beam assembly for a motor vehicle.

BACKGROUND

A cross car beam assembly is a structural member that typically extends between side pillars, which may be referred to as A-pillars, of a motor vehicle. An example cross car beam assembly is disclosed in U.S. Pat. No. 6,560,872.

SUMMARY

A modular cross car beam assembly for use with a vehicle includes an intermediate beam section, a driver side beam section, and a passenger side beam section. Furthermore, the driver side beam section and the passenger side beam section are attachable on either side of the intermediate beam section depending on whether the vehicle is a left-hand-drive vehicle or a right-hand-drive vehicle.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 1 is a perspective rear view of a cross car beam assembly, according to the disclosure, for use with a left-hand-drive vehicle;

FIG. 2 is a perspective rear view of a cross car beam assembly, according to the disclosure, for use with a right-hand-drive vehicle;

FIGS. 3A and 3B show a fragmentary, exploded perspective view and a fragmentary top view, respectively, of a connection arrangement for joining a beam section of the cross car beam assembly to a safety unit;

FIGS. 4A and 4B show a fragmentary, exploded perspective view and a fragmentary top view, respectively, of another connection arrangement for joining a beam section of the cross car beam assembly to a safety unit;

FIGS. 5A, 5B and 5C are various views of another embodiment of a safety unit connected to beam sections of the cross car beam assembly;

DETAILED DESCRIPTION

Figure 6:
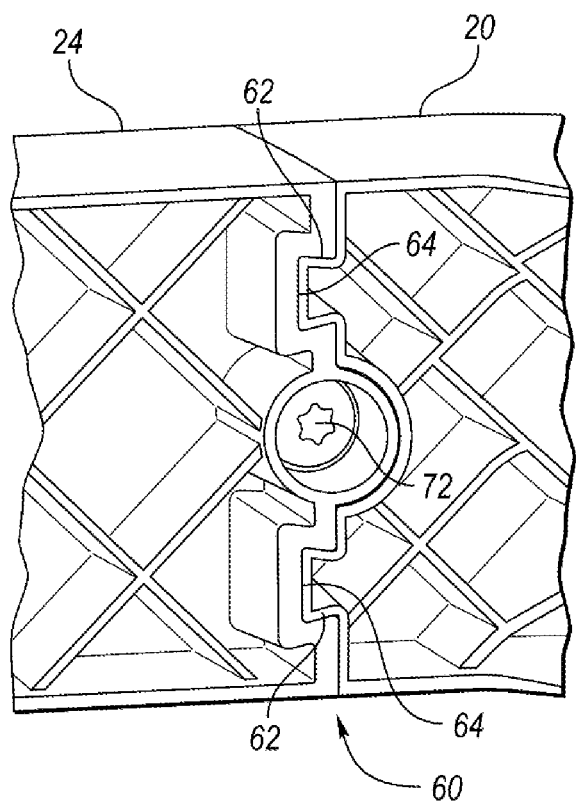
FIG. 6 is an enlarged, fragmentary perspective view of the circled portion, identified with reference numeral 6, of the cross car beam assembly shown in FIG. 1, and showing an example configuration of a tapered joint for joining together adjacent beam sections of the cross car beam assembly.
Figure 7:
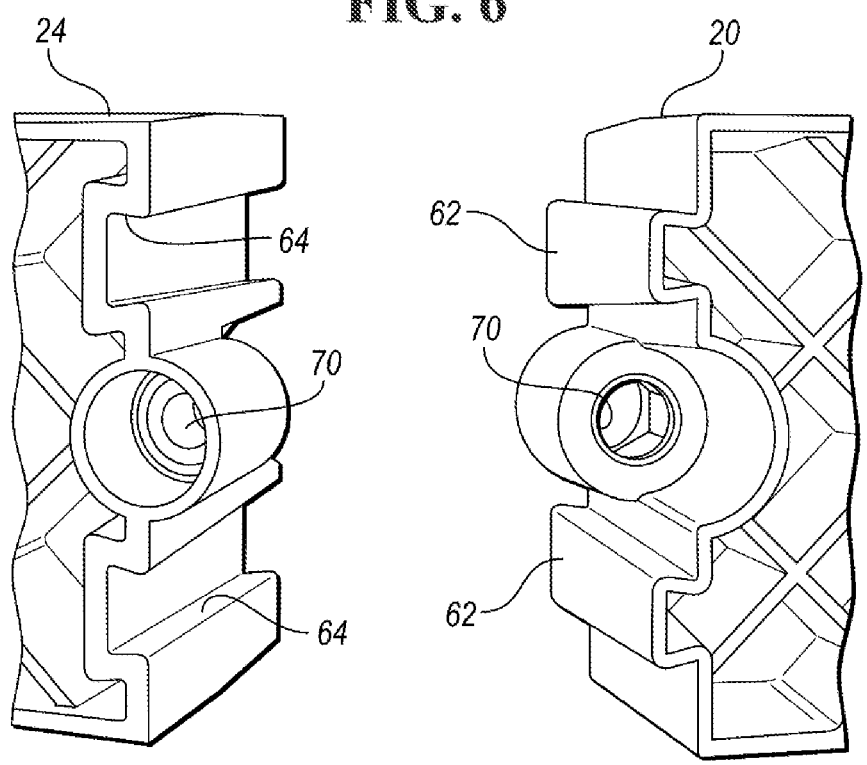
FIG. 7 is an exploded perspective view of the portion of the cross car beam assembly shown in FIG. 6.

As required, detailed embodiments are disclosed herein; however, it is to be understood that the disclosed embodiments are merely exemplary, and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIG. 1 shows a cross car beam assembly 10 according to the disclosure for use with a vehicle 12 having a vehicle body 13. The cross car beam assembly 10 is a structural member that is attachable to the vehicle body 13 in any suitable manner, such as with fasteners and/or adhesive, to provide structural support to the vehicle body 13. For example, the cross car beam assembly 10 may be connected to and extend between first and second side pillars 14 and 16, respectively, such as A-pillars, of the vehicle body 13. The cross car beam assembly 10 may also provide support to various vehicle components or elements, as explained below in detail.

In the embodiment shown in FIG. 1, the cross car beam assembly 10 is a modular cross car beam assembly having a first beam section or intermediate beam section 18, a second beam section or driver side beam section 20 and a third beam section or passenger side beam section 22. Furthermore, the driver side beam section 20 and the passenger side beam section 22 are attachable on either side of the intermediate beam section 18 depending on whether the vehicle 12 is a left-hand-drive vehicle or a right-hand-drive vehicle. In the embodiment shown in FIG. 1, the vehicle 12 is a left-hand-drive vehicle, so the driver side beam section 20 is on the left side of the cross car beam assembly 10, and the passenger side beam section 22 is on the right side of the cross car beam assembly 10. In the embodiment shown in FIG. 2, the vehicle 12' is a right-hand-drive vehicle, so the driver side beam section 20 is on the right side of the cross car beam assembly 10, and the passenger side beam section 22 is on the left side of the cross car beam assembly 10. Furthermore, the driver side beam section 20 and the passenger side beam section 22 may have the same or similar length and end configurations to facilitate attachment on either side of the intermediate beam section 18.

The cross car beam assembly 10 further includes first and second end beam sections 24 and 26, respectively, disposed at opposite ends of the cross car beam assembly 10. In the embodiment shown in FIG. 1, the first end beam section 24 is attached to the driver side beam section 20, and the second end beam section 26 is attached to the passenger side beam section 22. In the embodiment shown in FIG. 2, the first end beam section 24 is attached to the passenger side beam section 22, and the second end beam section 26 is attached to the driver side beam section 20. Furthermore, each end beam section 24, 26 includes an upper portion 28 configured to be connected to the driver side beam section 20 or the passenger side beam section 22, and a lower portion 30 that is configured to be spaced away from the intermediate beam section 18 when the cross car beam assembly 10 is assembled together.

The upper portions 28 of the end beam sections 24, 26 cooperate with the intermediate beam section 18 (e.g., an upper portion 31 of the intermediate beam section 18), the driver side beam section 20, and the passenger side beam section 22 to define a beam having a continuous upper beam section or part that extends from a first end 32 of the beam to an opposite second end 34 of the beam. As a result, the continuous upper beam part provides continuous rigid structure that extends from the first end 32 of the beam to the second end 34 of the beam.

Each lower portion 30 of the end beam sections 24, 26 may be spaced away from the intermediate beam section 18 (e.g., an upright side member 35 of the intermediate beam section 18, or a support bracket attached to the side member 35) by a distance in the range of 15 to 65 cm, or 25 to 65 cm, or 30 to 60 cm for example. As another example, each lower portion 30 may be spaced away from the intermediate beam section 18 by at least 15 cm, or at least 25 cm, or at least 30 cm.

The cross car beam assembly 10 may further include one or more safety units, such as airbag assemblies or modules, energy management brackets (e.g., plastically deformable brackets), etc., that are each connected to the intermediate beam section 18 and a respective end beam section 24, 26 at first and second joints, respectively. In the illustrated embodiment, the cross car beam assembly 10 includes first and second safety units 36 and 38, respectively, connected between the intermediate beam section 18 and the first and second end beam sections 24 and 26, respectively. Specifically, the first safety unit 36 is connected to the intermediate beam section 18 (e.g., a support bracket attached to the left side member 35 and/or an intermediate lateral member or portion 39 of the intermediate beam section 18) and the lower portion 30 (e.g., a support bracket of the lower portion 30) of the first end beam section 24, and the second safety unit 38 is connected to the intermediate beam section 18 (e.g., a support bracket attached to the right side member 35 and/or the intermediate lateral member 39 of the intermediate beam section 18) and the lower portion 30 (e.g., a support bracket of the lower portion 30) of the second end beam section 26. Each safety unit 36, 38 includes a rigid portion or member 40, such as a support structure, frame, base, housing or housing portion, that is configured to be connected to, and span the distance between, the intermediate beam section 18 and the lower portion 30 of a respective end beam section 24, 26, so that each rigid member 40 cooperates with the intermediate beam section 18 (e.g., the intermediate lateral member 39 of the intermediate beam section 18) and the lower portion 30 of the end beam section 24 or 26 to provide continuous rigid structure from an outer end of the end beam section 24 or 26 to an end of the intermediate beam section 18 opposite the safety unit 36, 38. Furthermore, the rigid members 40 cooperate with the lower portions 30 of the end beam sections 24, 26 and the intermediate beam section 18 (e.g., the intermediate lateral member 39) to provide continuous rigid structure along a lower beam section or part from the first end 32 of the beam to the second end 34 of the beam, so that the lower beam section of the cross car beam assembly 10 is substantially inflexible (e.g., flexes less than 1.0 mm, or less than 0.5 mm, over a length of 100 mm with a load of 1 kilonewton (kN) applied in a transverse direction) during normal use conditions of the vehicle 10. More generally, each rigid member 40 is configured to cooperate with first and second portions (e.g., a portion of one of the end beam sections 24, 26 and a portion of the intermediate beam section 18) of the cross car beam assembly 10 to provide continuous rigid structure from the first portion to the second portion, so that the cross car beam assembly 10 is substantially inflexible (e.g., flexes less than 1.0 mm, or less than 0.5 mm, over a length of 100 mm with a load of 1 kN applied in a transverse direction) from an outer end of the first portion to an outer end of the second portion during normal use conditions of the vehicle 10. Furthermore, the joints between each rigid member 40 and the first and second portions of the cross car beam assembly 10 may be configured to brace each end of each rigid member 40 in at least three different directions (e.g., x, y and z directions) so that each rigid member 40 may be inhibited or prevented from moving with respect to the first and second portions in any direction.

In the illustrated embodiment, each safety unit 36, 38 is an airbag assembly, and each rigid member 40 is a housing, or part of a housing, of the associated airbag assembly. Furthermore, each housing receives or houses an airbag (not shown) of the associated airbag assembly, and each housing is openable to release the airbag during deployment of the airbag. For example, each housing may have a cover 41 that is pivotable or otherwise movable with respect to a rigid housing base 42 during deployment of the associated airbag. In addition, each housing, or at least the housing base 42, is made of a rigid material, such as metal, plastic and/or a composite material, and each housing (e.g., housing base 42) is connected to the intermediate beam section 18 and the lower portion 30 of a respective end beam section 24, 26 in any suitable manner, such as with one or more fasteners 43 (e.g., screws or bolts). Furthermore, each end of each housing may include a locating tab 44 that is insertable into a slot formed in a downwardly facing section or support bracket portion of the intermediate beam section 18 or the lower portion 30 of a respective end beam section 24, 26 for properly locating the housing with respect to the beam sections 18, 24, 26.

Referring to FIGS. 3A-4B, alternative attachment schemes are shown for connecting each of the safety units 36, 38 to respective beam sections, such as the intermediate beam section 18 and the lower portion 30 of a respective end beam section 24, 26. In the embodiment shown in FIGS. 3A and 3B, the rigid member 40 of the safety unit 36 includes one or more upwardly oriented, integral interlocking features or connection features 46, such as receptacles, tabs or legs, at one end that mate with, or otherwise cooperate with, one or more corresponding integral interlocking features or connection features 48, such as receptacles, tabs or legs, formed on the lower portion 30 of the first end beam section 24 to interlock the components together, or otherwise facilitate connection of the components. For example, the connection features 46 may be molded, cast, stamped, or otherwise formed onto or into a main body of the rigid member 40, or attached (e.g., welded and/or adhesively attached) to a main body of the rigid member 40. Likewise, the connection features 48 may be molded, cast, stamped, or otherwise formed onto or into a main body of the lower portion 30, or attached (e.g., welded and/or adhesively attached) to a main body of the lower portion 30. One or more fasteners 43, such as upwardly oriented screws or bolts, may also be used to connect the rigid member 40 to the first end beam section 24. It should be understood that the opposite end (not shown) of the rigid member 40 of the safety unit 36 may be connected to the intermediate beam section 18 (not shown) in the same or similar manner. Likewise, the safety unit 38 may be connected to the intermediate beam section 18 and the lower portion 30 of the second end beam section 26 in the same or similar manner. As another example, the connection features shown in FIGS. 3A and 3B may be switched between the rigid member 40 of a respective safety unit 36, 38 and the beam sections 18, 24, 26.

Furthermore, the connection features 46, 48 associated with each rigid member 40 and corresponding beam sections may cooperate to brace the rigid member 40 in a longitudinal direction and/or lateral direction of the vehicle 12 when the cross car beam assembly 10 is mounted to the vehicle 12. For example, the respective connection features 46, 48 may have engagement faces that extend transverse to the longitudinal direction of the vehicle 12, and that are engageable with each other to brace each end of each rigid member 40 in forward and rearward directions of the vehicle 12 to inhibit or prevent movement of each rigid member 40 in the forward and rearward directions. In addition, or as an alternative, the respective connection features 46, 48 associated with each end of each rigid member 40 may have engagement faces that extend in the longitudinal direction of the vehicle 12, or generally in the longitudinal direction (e.g., within +/−30° or +/−20° or +/−10° of the longitudinal direction of the vehicle 12), and that are engageable with each other to brace the left end of each rigid member 40 in the left direction of the vehicle 12 and to brace the right end of each rigid member 40 in the right direction of the vehicle 12 to inhibit or prevent lateral movement of each rigid member 40. As another example, end faces of each rigid member 40 may be engageable with end faces of the corresponding beam sections 18, 24, 26 to laterally brace each rigid member 40. Referring to the embodiment shown in FIG. 3A, upwardly and downwardly facing engagement surfaces of each rigid member 40 and corresponding beam sections 18, 24, 26 may also be engageable with each other to brace each rigid member 40 in a vertical direction (e.g., z direction) to inhibit or prevent movement of each rigid member 40 in the vertical direction.

As yet another example, each end of each safety unit 36, 38 may be connected to a respective beam section with an upwardly oriented interlocking feature or connection feature formed on one component that is received between offset interlocking features or connection features formed on the other component. In the embodiment shown in FIGS. 4A and 4B, for example, the rigid member 40 of the safety unit 36 includes an upwardly oriented, integral connection feature 50, such as a tab or projection, at one end that is received between, or otherwise mates with, vertically and horizontally offset connection features 52, such as tabs or projections, formed on the lower portion 30 of the first end beam section 24 to interlock the components together. In the illustrated embodiment, each connection feature 50, 52 also has an opening, such as a threaded opening, for receiving a fastener 43, such as a laterally oriented screw or bolt, to join the components together. Furthermore, the two fasteners 43 shown each in each of FIGS. 4A and 4B are oriented in opposite directions when inserted into the threaded openings. It should also be understood that the opposite end (not shown) of the rigid member 40 of the safety unit 36 may be connected to the intermediate beam section 18 (not shown) in the same or similar manner. Likewise, the safety unit 38 may be connected to the intermediate beam section 18 and the lower portion 30 of the second end beam section 26 in the same or similar manner. In addition, the connection features shown in FIGS. 4A and 4B may be switched between the rigid member 40 of a respective safety unit 36, 38 and the beam sections 18, 24, 26. Furthermore, as mentioned above, the connection features 50, 52 associated with each rigid member 40 and corresponding beam sections may cooperate to brace the rigid member 40 in the longitudinal direction and/or lateral direction of the vehicle 12 when the cross car beam assembly 10 is mounted to the vehicle 12. For example, the respective connection features 50, 52 may have engagement faces that extend transverse to the longitudinal direction of the vehicle 12, and that are engageable with each other to brace each end of each rigid member 40 in forward and rearward directions of the vehicle 12 to inhibit or prevent movement of each rigid member 40 in the forward and rearward directions. Likewise, the respective connection features 50, 52 may have engagement faces that are engageable with each other to brace each rigid member 40 in left and right directions of the vehicle 12 to inhibit or prevent movement of each rigid member 40 in the left and right directions.

FIGS. 5A-5C show another example safety unit 36' formed as an energy management bracket. The energy management bracket 36' includes a rigid member 40', such as a rigid portion or frame (e.g., rectangular frame or laterally extending member), connected in any suitable manner to the intermediate beam section 18 and the lower portion 30 of the first end beam section 24 (or the lower portion 30 of the second end beam section 26 if the energy management bracket is positioned on the right side of the vehicle). For example, the rigid member 40' may be screwed or bolted to the beam sections 18, 24. In the illustrated embodiment, the beam sections 18, 24 include integral connection features 53, formed as notches, recesses, or lips, for example, that each receive or otherwise cooperate with an end portion of the rigid member 40'. For example, those connection features 53 may define upright abutment edges 53a that cooperate with end edges of the rigid member 40' to brace the rigid member 40' in the lateral direction. More specifically, the abutment edge 53a on the end beam section 24 may cooperate with (e.g., engage) the left end edge of the rigid member 40' to inhibit or prevent movement of the rigid member 40' to the left, and the abutment edge 53a on the intermediate beam section 18 may cooperate with (e.g., engage) the right end edge of the rigid member 40' to inhibit or prevent movement of the rigid member 40' to the right. In addition, or as an alternative, each connection feature 53 may define one or more laterally extending abutment edges 53b that cooperate with (e.g., engage) the rigid member 40' to inhibit or prevent movement of the rigid member 40' in the vertical direction (e.g., z direction), and/or an abutment surface 53c that cooperates with (e.g., engages) the rigid member 40' to inhibit or prevent movement of the rigid member 40' in the longitudinal direction of the vehicle (e.g., in a forward direction of the vehicle).

The energy management bracket 36' further includes a plastically deformable portion 54 connected in any suitable manner to the rigid member 40' and positioned rearward of the rigid member 40' when the cross car beam assembly 10 is mounted in the vehicle 12. For example, the plastically deformable portion 54 may be bolted, screwed and/or adhesively attached to the rigid member 40'. In the illustrated embodiment, the plastically deformable portion 54 includes contact portions 56 and 58 that are generally alignable with knees of a vehicle occupant when the cross car beam assembly 10 is mounted in the vehicle 12, and the occupant is sitting in a vehicle seat (not shown) directly behind the energy management bracket 36'. The rigid member 40' and the plastically deformable portion 54 may each be made of any suitable material, such as plastic, metal, and/or composite material, but the rigid member 40' is configured to be more rigid than the plastically deformable portion 54 so that the rigid portion 40' remains substantially inflexible (e.g., flexes less than 1.0 mm, or less than 0.5 mm, over a length of 100 mm with a load of 1 kN applied in a transverse direction) during normal use conditions, and so that the plastically deformable portion 54 may deform prior to the rigid member 40' during an impact event. For example, the rigid member 40' may be made of a more rigid material and/or have a greater thickness than the plastically deformable portion 54. Furthermore, the plastically deformable portion 54 is configured to plastically deform (e.g., crumple) during an impact event in order to manage (e.g., absorb or distribute) impact energy associated with the vehicle occupant, for example.

Each of the beam sections 18, 20, 22, 24 and 26 may likewise be made of any suitable material, such as metal, plastic and/or a composite material. Example metals include magnesium, aluminum and/or steel. Example plastics include polypropylene, acrylonitrile butadiene styrene (ABS) and/or nylon, with and without fillers including minerals and/or glass (e.g., fibers), for example. Example composite materials include carbon, glass and/or mineral filled materials, tape based materials and any combination of the previously mentioned materials. Furthermore, one beam section 18, 20, 22, 24, 26 may be made of one material, and another beam section, such as an adjacent beam section, may be made of another material. In the illustrated embodiment, each of the beam sections 18, 20, 22, 24 and 26 also has a lattice or grid structure that includes a plurality diagonally extending, interconnected webs. Such a structure may provide significant rigidity combined with light weight.

As mentioned above, the cross car beam assembly 10 may also provide support to various vehicle components or elements. For example, the driver side beam section 20 may support a steering column and steering wheel (not shown), the passenger side beam section 22 may support a glovebox frame (not shown), and the intermediate beam section 18 may support instrument panel elements (not shown), such as a radio, a navigation system, and/or a climate control system. Furthermore, the cross car beam assembly 10 may include various support brackets (not shown) connected to the beam sections 18, 20, 22, 24, 26 for supporting the above elements.

In addition, the beam sections 18, 20, 22, 24 and 26 may be connected together in any suitable manner, such as with one or more fasteners and/or welds. Furthermore, opposite ends of the upper portion 31 of the intermediate beam section 18 and inner ends of the upper portions 28 of the end beam sections 24 and 26 may have the same or similar configuration (e.g., attachment configuration), and opposite ends of each of the side beam sections 20 and 22 may also have the same or similar configuration (e.g., attachment configuration), which is complementary to the configuration of the ends of the upper portion 31 of the intermediate beam section 18 and the inner ends of the upper portions 28 of the end beam sections 24 and 26, to facilitate attachment of each side beam section 20, 22 on either side of the intermediate beam section 18. For example, opposite ends of the upper portion 31 of the intermediate beam section 18 may have mirror-image configurations (e.g., attachment configurations), and the inner ends of the upper portions 28 of the end beam sections 24 and 26 may also have mirror-image configurations (e.g., attachment configurations) so that the left end of the upper portion 31 of the intermediate beam section 18 has the same configuration as the inner end of the upper portion 28 of the end beam section 26, and so that the right end of the upper portion 31 of the intermediate beam section 18 has the same configuration as the inner end of the upper portion 28 of the end beam section 24. Likewise, opposite ends of each of the side beam sections 20 and 22 may have mirror image configurations (e.g., attachment configurations) so that the ends of the driver side beam section 20 have the same configuration as the ends of the passenger side beam section 22, and so that the left end of each side beam section 20, 22 is complementary to the inner end of the upper portion 28 of the end beam section 24 and the right end of the upper portion 31 of the intermediate beam section 18, and the right end of each side beam section 20, 22 is complementary to the inner end of the upper portion 28 of the end beam section 26 and the left end of the upper portion 31 of the intermediate beam section 18.

In the illustrated embodiment, adjacent beam sections are connected together by at least one tapered joint 60, such as a dovetail joint, that is tapered in two different directions, as explained below in detail. Furthermore, each tapered joint 60 may include at least one engagement member or structure, such as a projection or tenon, formed on one beam section, and at least one mortise, such as a socket, formed on another beam section that receives one or more of the engagement structures formed on the one beam section. Moreover, for each tapered joint 60, each engagement structure is tapered in a first direction and a second direction different than the first direction, and each corresponding socket is also tapered in the first direction and the second direction.

Referring to FIGS. 6-9, for example, each tapered joint 60 may include two engagement structures, such as projections 62, formed on one beam section, such as the driver side beam section 20, and two sockets 64 formed on the adjacent beam section, such as the first end beam section 24. Furthermore, each projection 62 is tapered in a first direction 66a, 66b, such as a longitudinal direction relative to the cross car beam assembly 10 and the vehicle 12, and a second direction 68a, 68b, such as a lateral direction relative to the cross car beam assembly 10 and the vehicle 12, that is different than the first direction 66a, 66b. In the embodiment shown in FIGS. 6-9, the first direction 66a extends longitudinally in a rearward direction relative to the vehicle 12, and the second direction 68a extends laterally to a right side of the vehicle 12 when the cross car beam assembly 10 is installed in the vehicle 12. Likewise, each socket 64 is also tapered in the first direction 66a and the second direction 68a. As another example, the first direction 66b may extend in a forward direction relative to the vehicle 12 when the cross car beam assembly 10 is installed in the vehicle 12, and/or the second direction 68b may extend laterally to a left side of the vehicle 12 when the cross car beam assembly 10 is installed in the vehicle 12. Referring to FIG. 10, for example, the tapered joint 60 formed between an opposite end of the driver side beam section 20 and the intermediate beam section 18 may include two projections 62 formed on the driver side beam section 20, wherein each projection 46 is tapered in the first direction 66a and the second direction 68b. Likewise, that tapered joint 60 may include two sockets 64 that are also each tapered in the first direction 66a and the second direction 68b.

Figure 8:
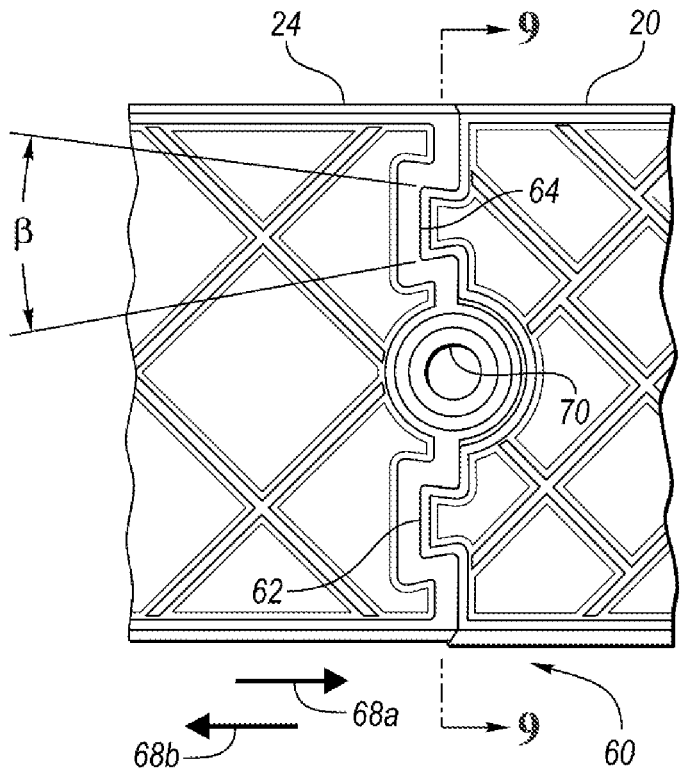
FIG. 8 is a fragmentary rear view of the portion of the cross car beam assembly shown in FIG. 6.
Figure 9:
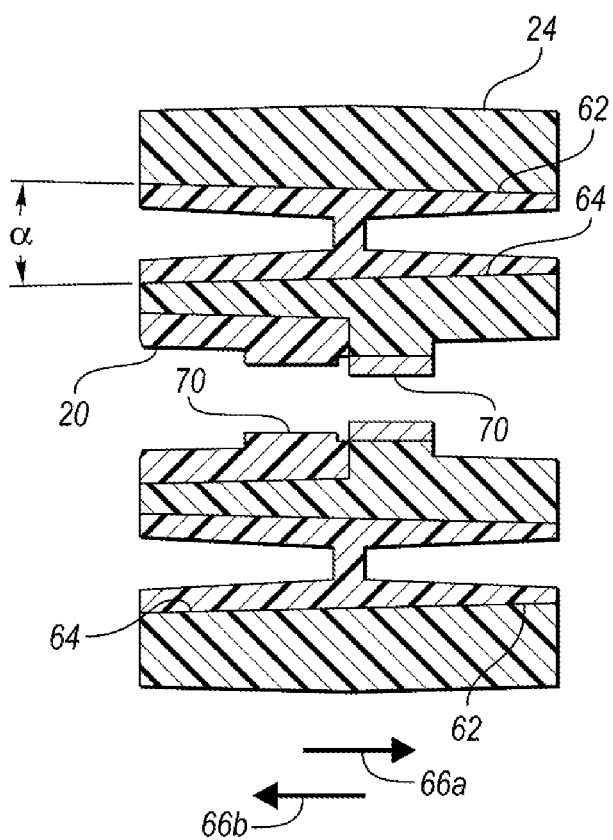
FIG. 9 is a cross-sectional view taken along line 9-9 in FIG. 8 and viewed in the direction of the arrows.
Figure 10:
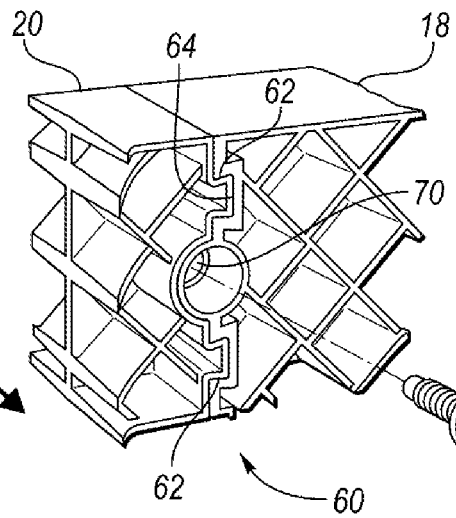
FIG. 10 is an enlarged, fragmentary perspective view of the circled portion, identified with reference numeral 10, of the cross car beam assembly shown in FIG. 1, and showing another example configuration of a tapered joint according to the disclosure for joining together adjacent beam sections of the cross car beam assembly.
Figure 11A:
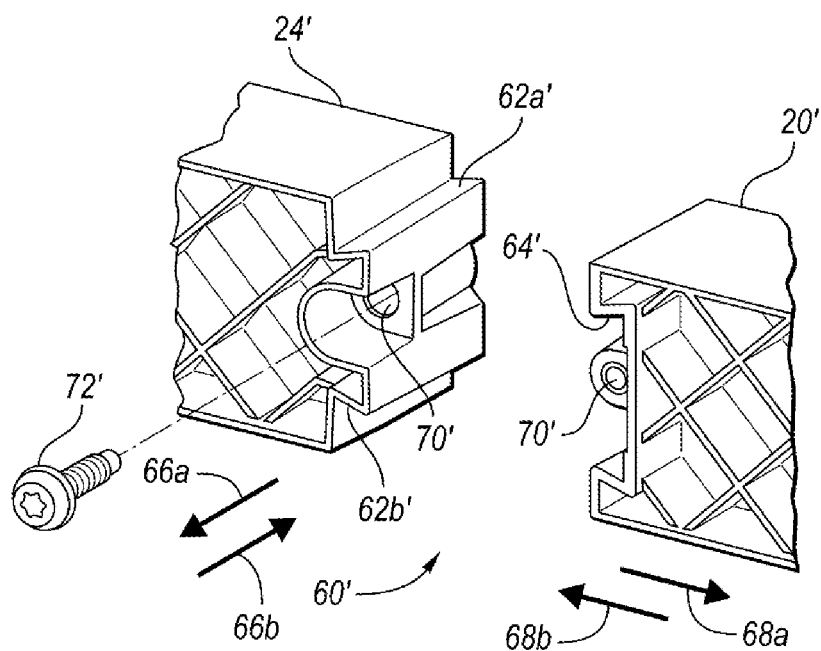
FIGS. 11A and 11B are exploded, fragmentary perspective views of another embodiment of a tapered joint for joining together adjacent beam sections.
Figure 11B:
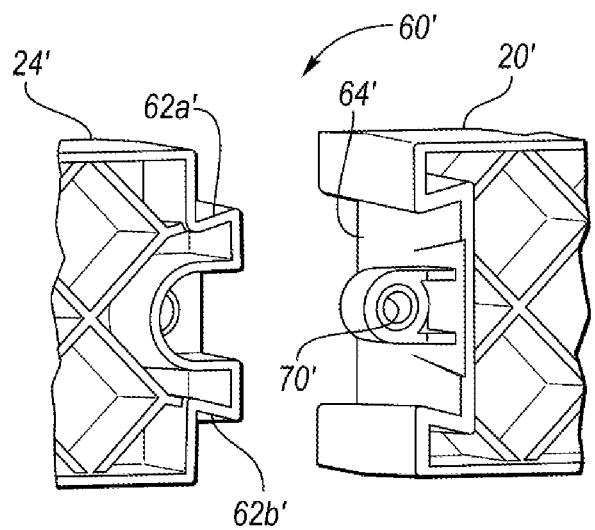
Figure 12:
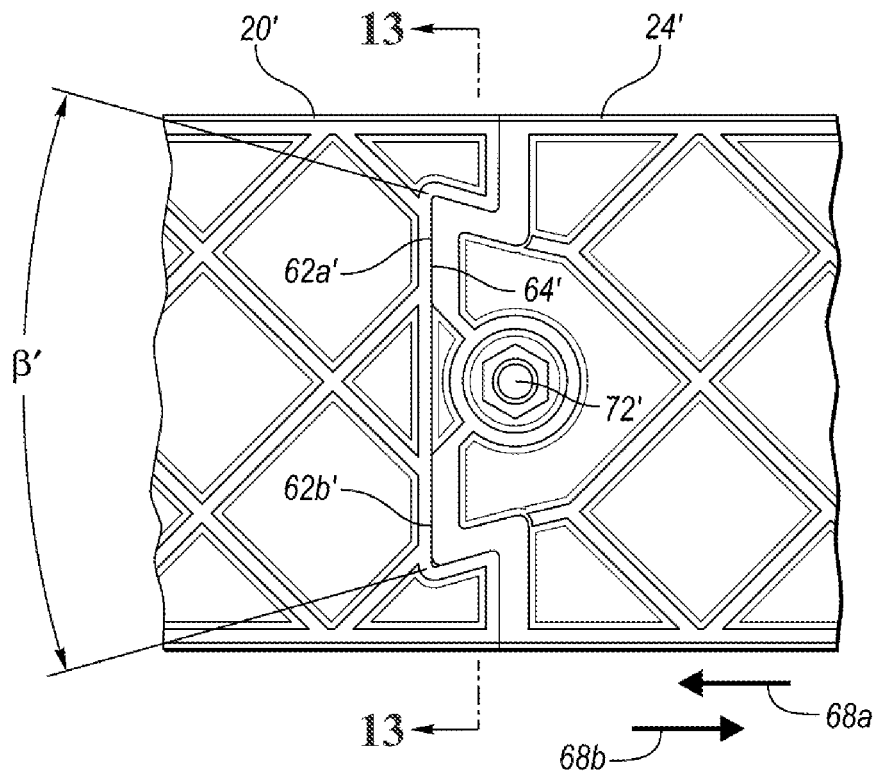
FIG. 12 is a fragmentary front view of the tapered joint shown in FIGS. 11A and 11B.
Figure 13:
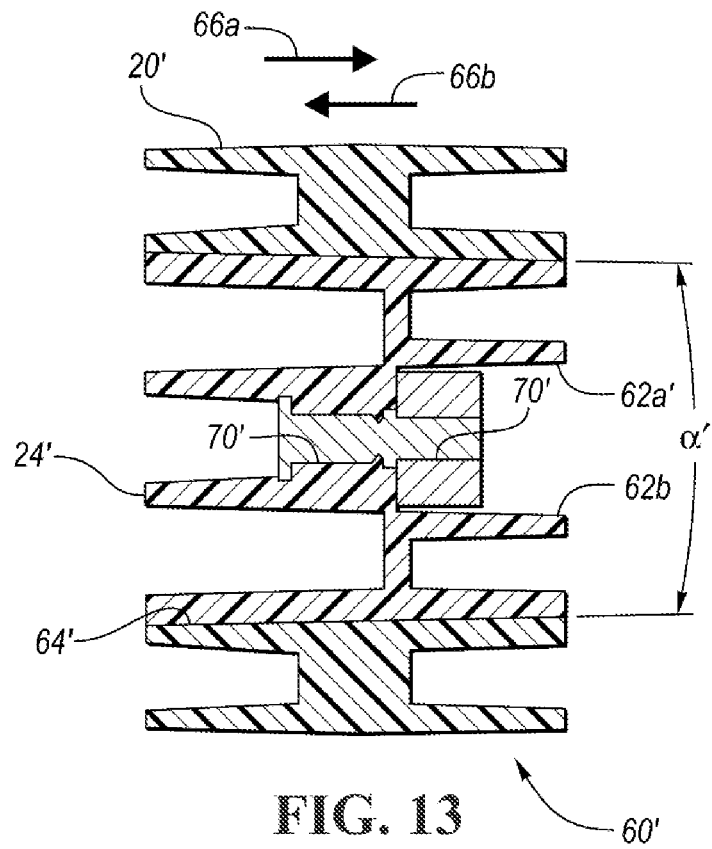
FIG. 13 is a cross-sectional view taken along line 13-13 in FIG. 12, and viewed in the direction of the arrows.

Referring to FIGS. 8 and 9, each projection 62 may be tapered in the first direction 66a, 66b at any suitable angle, such as an angle $\alpha$ in the range of 1 to 10° or 2 to 5° (e.g., 3.5°, or more particularly 3.56°), and each projection 62 may also be tapered in the second direction 68a, 68b at any suitable angle, such as an angle $\beta$ in the range of 10 to 45° or 10 to 30° (e.g., 20°). Likewise, each socket 64 may be tapered in the first direction 66a, 66b at any suitable angle, such as an angle α in the range of 1 to 10° or 2 to 5° (e.g., 3.5°, or more particularly 3.56°), and each socket 64 may also be tapered in the second direction 68a, 68b at any suitable angle, such as an angle β in the range of 10 to 45° or 10 to 30° (e.g., 20°).

In the above embodiment, the first direction 66a, 66b and the second direction 68a, 68b are generally transverse or perpendicular to each other. As another example, the first direction 66a, 66b may extend at any suitable angle with respect to the second direction 68a, 68b. For example, the first direction 66a, 66b may extend at an angle in the range of 80 to 100° with respect to the second direction 68a, 68b.

Although the tapered joints 60 are described above with respect to the intermediate beam section 18, the driver side beam section 20 and the first end beam section 24, each tapered joint 60 between adjacent beam sections 18, 20, 22, 24, 26 may have the same or similar configuration. Furthermore, each tapered joint 60 may be formed with any suitable number of engagement structures, such as projections 62, and sockets 64 to facilitate joining the beam sections 18, 20, 22, 24, 26 together. In addition, one or more tapered joints 60 may include a projection 62 formed on each of two adjacent beam sections, and a socket 64 formed on each of the two adjacent beam sections for receiving a respective projection 62.

In one embodiment, for each tapered joint 60, the corresponding one or more engagement structures (e.g., projections 62) and one or more sockets 64 may all be tapered in the same first direction 66a or 66b. However, the one or more engagement structures (e.g., projections 62) and/or one or more sockets 64 on opposite ends of the intermediate beam section 18, as well as on opposite ends of each of the side beam sections 20 and 22, may be tapered in a different second direction 68a or 68b. In the embodiment shown in FIGS. 1 and 2, for example, all of the projections 62 and sockets 64 are tapered in the first direction 66a. The projections 62 on the left side of the driver side beam section 20 and the projections 62 on the left side of the passenger side beam section 22 are tapered in the second direction 68a, and the projections 62 on the right side of the driver side beam section 20 and the projections 62 on the right side of the passenger side beam section 22 are tapered in the second direction 68b. Likewise, the sockets 64 on the left side of the intermediate beam section 18 are tapered in the second direction 68b, and the sockets 64 on the right side of the intermediate beam section 18 are tapered in the second direction 68a. Such a configuration may facilitate positioning of each of the side beam sections 20, 22 on either side of the intermediate beam section 18.

With the above configuration, adjacent beam sections 18, 20, 22, 24, 26 may be connected together by sliding one beam section relative to the other beam section in the first direction 66a or 66b, for example, so that the one or more engagement structures (e.g., projections) formed on the one beam section mate with, or are received by, the one or more sockets on the other beam section. Furthermore, each tapered joint 60 may utilize opposing draft angles (e.g., for molded or cast parts) of the projections and sockets as tapered contact surfaces. Those contact surfaces may function as integral reaction surfaces designed to counter forces imparted on the cross car beam assembly 10 during vehicle operation. For example, the tapered contact surfaces of each tapered joint 60 may brace the associated beam sections in longitudinal, lateral and/or vertical directions of the vehicle.

Referring to FIGS. 6-9, each tapered joint 60 may also include an opening 70 formed in each adjacent beam section, and the openings 70 are alignable with each other when the cross car beam assembly 10 is assembled together. Furthermore, a fastener 72, such as a screw or bolt, is insertable into the aligned openings 70 to assist in attaching the adjacent beam sections together. In the embodiment shown in FIGS. 6-9, each opening 70 is positioned between the projections 62 or the sockets 64 of the respective beam section 20, 24.

In addition or as an alternative to the fastener 72, each tapered joint 60 may include any suitable secondary or further attachment means. For example, each tapered joint 60 may be glued (e.g., with any suitable adhesive) and/or welded together.

FIGS. 11A-13 show another embodiment of a tapered joint 60' according to the present disclosure that may be used with any of the beam sections 18, 20, 22, 24, 26. That tapered joint 60' includes an engagement structure having multiple projections or projection parts, such as first and second projection parts 62a' and 62b' formed on one beam section, such as first end section 24', and a socket 64' formed on the adjacent beam section, such as driver side section 20'. Furthermore, the socket 64' is configured to receive the multiple projection parts 62a' and 62b'. In this embodiment, an outer surface of the first projection part 62a' and an outer surface of the second projection part 62b' define a taper angle α' in the first direction 66a in the range of 1 to 10° or 2 to 7.5° (e.g., 4.7°), and the socket 64' is also tapered in the first direction 66a at an angle in the range of 1 to 10° or 2 to 7.5° (e.g., 4.7°). In addition, the outer surface of the first projection part 62a' and the outer surface of the second projection part 62b' define a taper angle β' in the second direction 68b in the range of 10 to 45° or 20 to 40° (e.g., 30°), and the socket 64' is also tapered in the second direction 68b at an angle in the range of 10 to 45° or 20 to 40° (e.g., 30°) °. As another example, the taper angles α' and β' of the engagement structure may each be within any suitable range, and the corresponding taper angles of the socket 64' may each likewise be within any suitable range.

Like the tapered joint 60, the tapered joint 60' may also include an opening 70' formed in each adjacent beam section, and the openings 70' are alignable with each other to receive a fastener 72', such as a screw or bolt, when the cross car beam assembly 10' is assembled together. The fastener 72' may therefore function as a secondary attachment means to assist in attaching adjacent beam sections together. In the embodiment shown in FIGS. 11A-13, the opening 70' of the first end section 24' is formed in an intermediate portion between the projection parts 62a' and 62b', and the opening 70' formed in the driver side section 20' is formed in a tab positioned in the socket 64'.

In the embodiment shown in FIGS. 11A-13, the projection parts 62a' and 62b' and the intermediate portion on the first end section 24' cooperate to define a single projection. In another embodiment, the projecting parts 62a' and 62b' may not be connected together by an intermediate portion, such that the projecting parts 62a' and 62b' form separate projections.

Furthermore, like the tapered joint 60, each tapered joint 60' may include any suitable secondary or additional attachment means, if desired. For example, each tapered joint 60' may be glued and/or welded together.

Furthermore, any of the above described tapered joint configurations may have any suitable orientation. For example, any of the above described tapered joints may be oriented laterally, as shown in FIGS. 6-13, or vertically (e.g., so that corresponding engagement structures and sockets are oriented vertically).

With the above described modular configuration, the same beam sections 18, 20, 22, 24 and 26 may be used to make a cross car beam assembly 10 for a left-hand-drive vehicle 12 or a right-hand-drive vehicle 12'. As a result, the same tools (e.g., molds, presses, stamping tools, etc.) may be used to make the same beam sections for each vehicle, and the driver side beam section 20 and the passenger side beam section 22 may be positioned as needed to achieve the desired cross car beam assembly configuration. Therefore, the above modular configuration may result in significantly lower tooling costs compared to the tooling needed to produce prior cross car beam assemblies for use with left-hand-drive vehicles and right-hand-drive vehicles.

Although tapered joints are described above in detail as example connection means between adjacent beam sections 18, 20, 22, 24, 26, the beam sections may be connected together in any suitable manner. For example, as mentioned above, adjacent beam sections 18, 20, 22, 24, 26 may be connected together with one or more fasteners and/or one or more welds. Furthermore, the above described tapered joints may be used with cross car beam assemblies that do not have the above described modular characteristic. In that regard, any of the above described tapered joint configurations may be used to connect together any two sections or portions of a crossbar beam assembly.

Furthermore, the above described tapered joint configurations may be used in any other suitable automotive application. For example, any of the above tapered joint configurations may be used to connect any of the above described safety units (i.e., associated rigid members) to respective beam sections. As another example, any of the above tapered joint configurations may be used to connect first and second portions or sections of a vehicle seat frame, vehicle frame (e.g., front or rear chassis sub frame), bumper crash beam (e.g., front or rear bumper crash beam), or any other assembly that may have a structural joint. Still further, any of the above described tapered joint configurations may be used in any other suitable non-automotive application. For example, any of the above tapered joint configurations may be used to connect first and second portions or sections of a building frame (e.g., house frame or office frame). Furthermore, any of the above described tapered joint configurations may have any suitable orientation when used in any suitable application. For example, any of the above described tapered joints may be oriented laterally, such as shown in FIGS. 6-13, or vertically (e.g., so that corresponding engagement structures and sockets are oriented vertically). In general, an assembly according to the disclosure may include first and second sections that are connected together by a tapered joint, wherein the tapered joint includes an engagement structure formed on the first section, and a socket formed on the second section that receives the engagement structure. Furthermore, the engagement structure may be tapered in a first direction and a second direction different than the first direction, and the socket may also be tapered in the first direction and the second direction.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A modular cross car beam assembly for use with a vehicle, the cross car beam assembly comprising:
   an intermediate beam section;
   a driver side beam section; and
   a passenger side beam section;
   wherein the driver side beam section and the passenger side beam section are attachable on either side of the intermediate beam section depending on whether the vehicle is a left-hand-drive vehicle or a right-hand-drive vehicle.

2. The modular cross car beam assembly of claim 1 wherein the driver side beam section comprises first and second opposite ends that each have an attachment configuration, and the passenger side beam section comprises first and second opposite ends that each have an attachment configuration, and wherein the attachment configuration at the first end of the driver side beam section is the same as the attachment configuration at the first end of the passenger side beam section, and the attachment configuration at the second end of the driver side beam section is the same as the attachment configuration at the second end of the passenger side beam section to facilitate attachment of the side beam sections on either side of the intermediate beam section.

3. The modular cross car beam assembly of claim 1 wherein the driver side beam section comprises first and second opposite ends having mirror image configurations and the passenger side beam section comprises first and second opposite ends having mirror image configurations, and wherein the first end of the driver side beam section has the same configuration as the first end of the passenger side beam section and the second end of the driver side beam section has the same configuration as the second end of the passenger side beam section to facilitate attachment of the side beam sections on either side of the intermediate beam section.

4. The cross car beam assembly of claim 1 further comprising:
   an end beam section including an upper portion configured to be connected to the driver side beam section or the passenger side beam section, and a lower portion that is configured to be spaced away from the intermediate beam section when the cross car beam assembly is assembled together; and
   a safety unit configured to be connected between the intermediate beam section and the lower portion of the end beam section, the safety unit including a rigid member that is configured to cooperate with the intermediate beam section and the lower portion of the end beam section to provide continuous rigid structure from an outer end of the end beam section to an end of the intermediate beam section opposite the safety unit when the cross car beam assembly is assembled together.

5. The cross car beam assembly of claim 4 wherein the safety unit comprises an airbag assembly, and the rigid member comprises at least a portion of a housing of the airbag assembly.

6. The cross car beam assembly of claim 1 further comprising:
   end beam sections that are attachable to the driver side beam section and the passenger side beam section, each end beam section including an upper portion configured to be connected to the driver side beam section or the passenger side beam section, and a lower portion that is configured to be spaced away from the intermediate beam section when the cross car beam assembly is assembled together; and
   safety units that are each configured to be connected between the lower portion of a respective end beam section and the intermediate beam section, each safety unit including a rigid member, wherein the rigid members are configured to cooperate with the lower portions of the end beam sections and the intermediate beam section to provide continuous rigid structure from an outer end of one end beam section to an outer end of the other end beam section when the cross car beam assembly is assembled together.

7. The cross car beam assembly of claim 6 wherein at least one of the safety units comprises an airbag assembly.

8. The cross car beam assembly of claim 7 wherein the rigid member of the at least one of the safety units comprises at least a portion of a housing of the airbag assembly.

9. The cross car beam assembly of claim 1 wherein the driver side beam section and the passenger side beam section are each configured to be connected to the intermediate beam section by a tapered joint that is tapered in two different directions.

10. The cross car beam assembly of claim 9 wherein the two directions include a first direction and a second direction that is generally transverse to the first direction.

11. The cross car beam assembly of claim 9 wherein each tapered joint is a dovetail joint that includes one of a projection and a mortise on the driver side beam section or the passenger side beam section, and the other of the projection and the mortise on the intermediate beam section, wherein, for at least one of the tapered joints, the projection is tapered in a first direction and a second direction different than the first direction, the mortise is also tapered in the first direction and the second direction, and the mortise is configured to slidably receive the projection.

12. The cross car beam assembly of claim 11 wherein each dovetail joint further includes one of an additional projection and an additional mortise on the driver side beam section or the passenger side beam section, and the other of the additional projection and the additional mortise on the intermediate beam section, wherein each additional projection is tapered in two different directions, and each additional mortise is also tapered in two different directions, and wherein each additional mortise is configured to slidably receive a respective additional projection.

13. The cross car beam assembly of claim 11 wherein the intermediate beam section includes first and second openings at opposite ends of the intermediate beam section, and the driver side beam section and the passenger side beam section each include an opening that is alignable with one of the openings of the intermediate beam section to receive a fastener.

14. The cross car beam assembly of claim 13 wherein each dovetail joint further includes one of an additional projection and an additional mortise on the driver side beam section or the passenger side beam section, and the other of the additional projection and the additional mortise on the intermediate beam section, wherein each additional projection is tapered in two different directions, and each additional mortise is also tapered in two different directions, wherein each additional mortise is configured to slidably receive a respective additional projection, and wherein, when the cross car beam assembly is assembled together, each opening of the intermediate beam section is positioned between a respective projection and a respective additional projection.

15. The cross car beam assembly of claim 9 wherein each tapered joint includes an engagement structure on the driver side beam section or the passenger side beam section, and a socket formed on the intermediate beam section that is configured to receive the engagement structure, and wherein, for at least one of the tapered joints, the engagement structure is tapered in a first direction and a second direction, and the socket is tapered in the first direction and the second direction.

16. The cross car beam assembly of claim 15 wherein each engagement structure includes first and second projection parts, and wherein each socket is configured to receive the first and second projection parts of a respective engagement structure.

17. The cross car beam assembly of claim 9 wherein each tapered joint includes an engagement structure formed on the intermediate beam section, and a socket formed on the driver side beam section or the passenger side beam section that is configured to receive the engagement structure, and wherein, for at least one of the tapered joints, the engagement structure is tapered in a first direction and a second direction, and the socket is tapered in the first direction and the second direction.

18. The cross car beam assembly of claim 1 wherein at least one of the intermediate beam section, the driver side beam section, or the passenger side beam section comprises plastic.

19. The cross car beam assembly of claim 1 wherein at least one of the intermediate beam section, the driver side beam section, or the passenger side beam section comprises a composite material.

20. The cross car beam assembly of claim 1 wherein at least one of the intermediate beam section, the driver side beam section, or the passenger side beam section comprises metal.

\* \* \* \* \*